US006675990B2

(12) United States Patent
Cocchi

(10) Patent No.: US 6,675,990 B2
(45) Date of Patent: Jan. 13, 2004

(54) PISTON DEVICE FOR DISPENSING CONTROLLED AMOUNTS OF PASTY SUBSTANCES

(75) Inventor: Gino Cocchi, Bologna (IT)

(73) Assignee: ALI S.p.A. (IT)

( * ) Notice: Subject to any disclaimer, the term of this patent is extended or adjusted under 35 U.S.C. 154(b) by 0 days.

(21) Appl. No.: 10/452,205

(22) Filed: Jun. 3, 2003

(65) Prior Publication Data

US 2003/0226858 A1 Dec. 11, 2003

(30) Foreign Application Priority Data

Jun. 5, 2002 (IT) .................................... GE2002A0049

(51) Int. Cl.$^7$ .............................................. G01F 11/42
(52) U.S. Cl. ..................... 222/218; 222/306; 222/318; 222/363
(58) Field of Search ................. 222/218, 306, 222/309, 318, 363, 366, 434, 438

(56) References Cited

U.S. PATENT DOCUMENTS

| 1,763,487 | A | * | 6/1930 | Taylor | 222/363 |
|---|---|---|---|---|---|
| 3,661,303 | A | * | 5/1972 | Prosenbauer | 222/309 |
| 3,794,234 | A | * | 2/1974 | Pardo | 222/218 |
| 4,009,788 | A | * | 3/1977 | Waldhofer | 222/218 |
| 4,634,026 | A | * | 1/1987 | Suay Puig et al. | 222/218 |
| 5,211,968 | A | * | 5/1993 | Judex | 222/306 |

FOREIGN PATENT DOCUMENTS

| AT | 257332 | 10/1967 | |
|---|---|---|---|
| FR | 2598647 A1 | * 11/1987 | A21C/5/04 |

* cited by examiner

Primary Examiner—Kenneth Bomberg
(74) Attorney, Agent, or Firm—Larson & Taylor, PLC

(57) ABSTRACT

A piston device for dispensing controlled amounts of pasty substances, such as ice creams, that is connectable to the freezing chamber of an ice cream making machine. Said device comprises a cylindrical closing element mounted rotatably about its axis in a mating cradle support, recessed into which cylindrical closing element is a cylinder that extends diametrically across said closing element and is closed at the bottom by a wall containing a hole, while a piston slides axially inside the said cylinder, and in which the said cradle support contains a communicating channel leading to the freezing chamber of the ice cream making machine, so that in one angular position of the cylindrical closing element the channel of the support is lined up with the hole of the bottom wall, while in a second angular position of the cylindrical closing element the hole of the bottom wall of the cylinder is lined up with a dispensing hole provided in the said cradle support, while the side wall of the cylindrical closing element is provided with an elongate passage which in a third position of the cylindrical closing element connects together the feed hole and the dispensing hole of the support, bypassing the said cylinder.

13 Claims, 2 Drawing Sheets

PISTON DEVICE FOR DISPENSING CONTROLLED AMOUNTS OF PASTY SUBSTANCES

BACKGROUND AND SUMMARY OF THE INVENTION

The present invention relates to devices for dispensing pasty substances, such as ice creams for example, that is connectable to the machines that make the said substances.

More particularly, the invention relates to a piston device for dispensing ice creams in predetermined quantities, which device is connectable to the closing door of the freezing chamber of an ice cream making machine, preferably a soft ice cream making machine of the "self-service" type operated automatically by coins or tokens.

Ice cream dispensers are known consisting of a dosing piston device (see for example Austrian Patent No. 257332 of 14.9.1965) that basically comprises a cylinder containing an axially sliding expulsion piston and a counter-piston, between which a measuring chamber is formed when the expulsion piston is raised, this chamber being filled with the ice cream coming from the freezing chamber of an ice cream making machine, after which both pistons are slid axially with the volume of ice cream held between them until the counter-piston meets a stop, such that further movement of the expulsion piston expels the volume of ice cream contained between the piston and the counter-piston through a dispensing port.

These known devices are mechanically complex, are difficult to adjust when it is wished to change the amount of product dispensed, and above all are difficult to maintain and to clean.

The object of the present invention is therefore to provide a piston device for dispensing controlled amounts of pasty substances, particularly ice creams, that can be connected to the door of the freezing chamber of an ice cream making machine, in such a way as to overcome the drawbacks and disadvantages of known piston devices that deliver metered amounts of substance.

In accordance with one feature of the present invention, the dispensing device delivers metered amounts of substance comprises a cylindrical closing element mounted rotatably about its axis in a mating cradle support, recessed diametrically into which cylindrical closing element is a cylindrical housing (hereinafter abbreviated to "cylinder") that is closed at the bottom by a wall containing a hole, while a piston slides axially inside the said cylinder, and in which the said cradle support contains a communicating hole leading to the freezing chamber of the ice cream making machine, so that in one angular position of the said cylindrical closing element the said hole of the support is lined up with the hole of the bottom wall of the said cylinder, while in a second angular position of the said cylindrical closing element the said hole of the bottom wall of the cylinder is lined up with a dispensing hole provided in the said cradle support, while the side wall of the said cylindrical closing element is provided with an elongate passage which in a third position of the said cylindrical closing element connects together the feed hole and the dispensing hole of the support, bypassing the said cylinder.

BRIEF DESCRIPTION OF THE DRAWINGS

Other features and advantages of the present invention will become clearer in the following detailed description of a preferred embodiment of the present invention, illustrated in the appended drawings, in which.

DESCRIPTION OF THE PREFERRED EMBODIMENTS OF THE INVENTION

Figure 1:
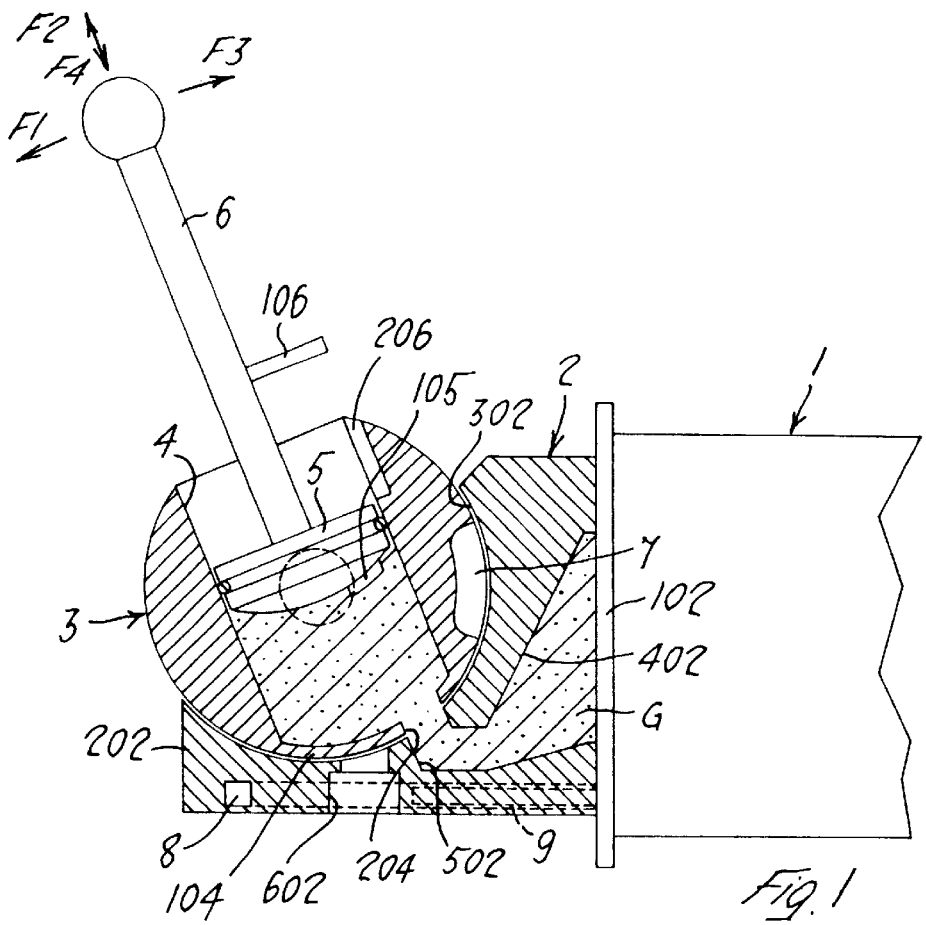
FIG. 1 shows in longitudinal section the device according to the invention connected to the door of a freezing chamber, in the operating position in which the ice cream is fed into the metering cylinder. The cylindrical closing element of the device according to the invention has been rotated into this position about its transverse axis so that the hole in the bottom of the metering cylinder is lined up with the ice cream feed hole.

Referring to the drawings, and with particular reference to FIG. 1 thereof, the number 1 denotes the freezing chamber of an ice cream making machine, of which only the front end is visible. This chamber is cooled, in a known manner, by the evaporator (not shown) of a refrigerating circuit, and is equipped with an internal stirrer/mixer (also not shown).

The chamber 1 is closed at the front end by the door 2 which houses the dispensing piston device according to the invention. As illustrated in longitudinal section in FIG. 1, the door 2 comprises a base 102 that is attached leaktightly by suitable fixing means (not shown) to the end of the chamber 1, and a part 202 in which a cylindrical cradle housing 302 is formed that extends around an angle of slightly less than 180°. The base 102 contains a channel 402 that communicates on one side with the chamber 1, while on the other side it ends in the hole 502 that opens into the housing 302. A second hole 602 is provided at a short distance downstream, in the clockwise direction, of the said hole 502 and communicates on one side with the housing 302, while on the other side it communicates with the exterior, forming the ice cream dispensing hole.

The cylindrical closing element 3, the diameter of which is complementary to the diameter of the housing 302, is mounted inside the housing 302 such that it can rotate about its axis. The cylindrical closing element 3 contains a cylinder 4 whose axis, which is perpendicular to the axis of the closing element 3, extends diametrically across the said cylindrical closing element 3. This cylinder 4 is open at its end furthest from the housing 302, while at its other end it is closed by a wall 104 containing a hole 204 that is eccentric with respect to the axis of the cylinder 4.

Figure 2:
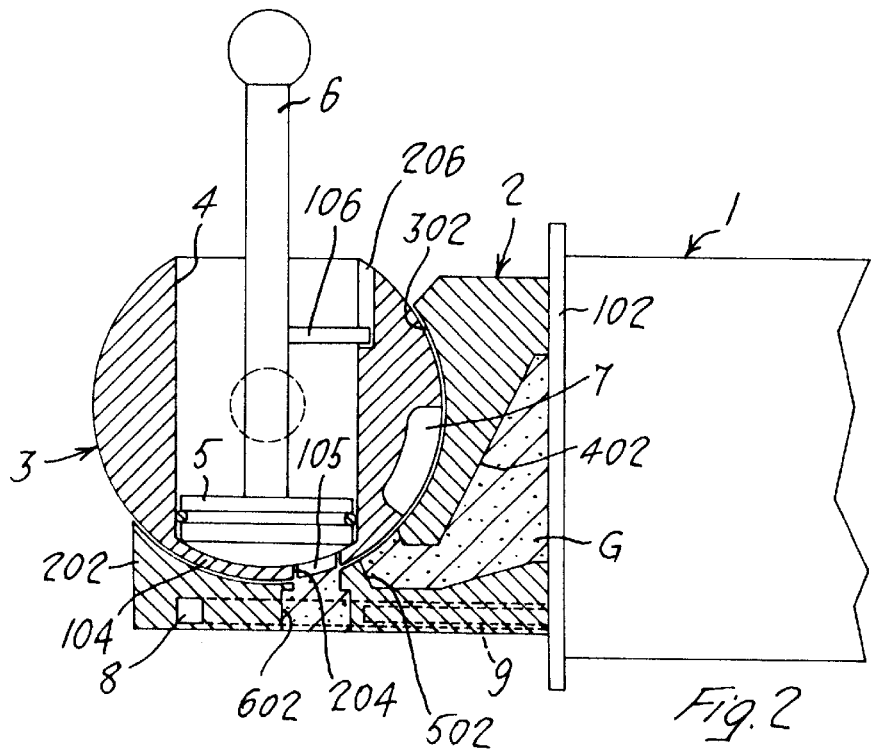
FIG. 2 is a view similar to FIG. 1, in which the cylindrical closing element of the device according to the invention has been rotated until the hole in the bottom of the metering cylinder is lined up with the ice cream dispensing hole of the door, at the same time closing the ice cream feed hole.

A sliding piston 5 is mounted inside the cylinder 4, which piston is provided with a hemispherical crown with a radius of curvature that is the same as the radius of curvature of the bottom wall 104, and is provided with an eccentric circular button 105 that projects outwards and is complementary to the hole 602 (FIG. 2). The piston 5 is provided with a control rod 6, projecting radially outwards from which is a pin 106 capable of being engaged in a slot 206 formed in the inside wall of the cylinder 4 along one of the generatrices of the said cylinder, for purposes which will be described later.

In addition, there is formed on the cylindrical side wall of the closing element 3 an elongate passage 7 capable of connecting together the holes 502 and 602, as will be described later.

Figure 4:
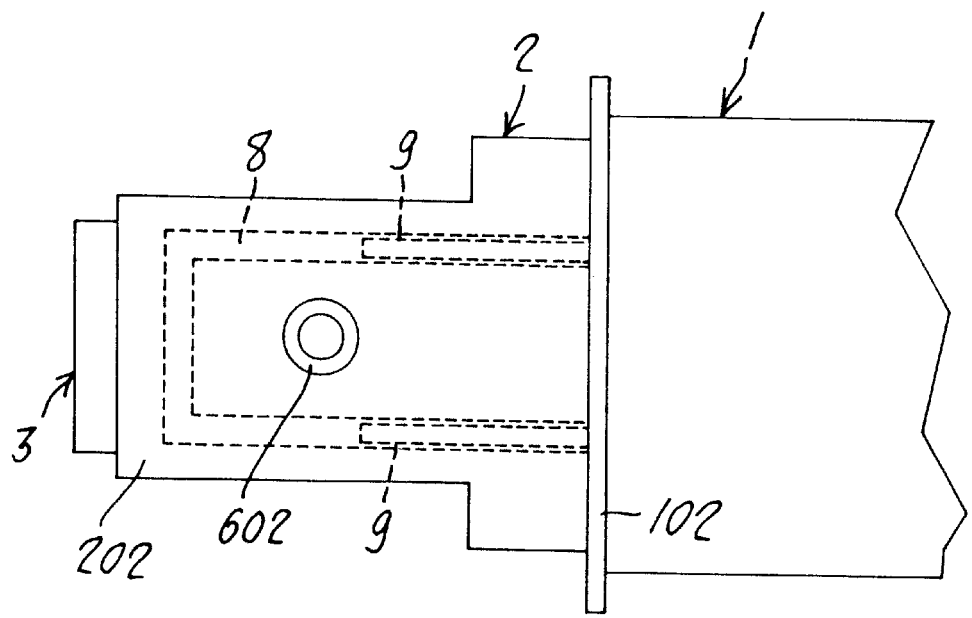
FIG. 4 is a plan view from below of the device shown in the previous FIGS. 1 to 3.

Lastly, as shown more clearly in FIG. 4, there is formed in the bottom of the door 2, all the way around the ice cream dispensing hole 602, an essentially U-shaped channel 8 that surrounds the said hole 602, which channel receives the pair of tubes 9 belonging to the evaporator (not shown) of the refrigerating circuit which surrounds the side wall of the freezing chamber 1.

The device described works in the following manner.

It is assumed that the device is in its initial position, or rest position, illustrated in FIG. 2. In this position the cylindrical closing element 3 closes the ice cream G feed port 502, while the piston 5 has been pushed all the way down into the cylinder 4, and the surface of its crown is in contact with the bottom of this cylinder, with the element 105 inserted into the dispensing hole 602 and closing it. The pin 106 has been guided all the way down to the bottom of the slot 206. The job of this pin is to position the eccentric element 105 correctly with respect to the equally eccentric dispensing hole 602.

If it is wished to dispense a serving of ice cream, the cylindrical closing element 3 is rotated in the direction of arrow F1 until the hole 204 of the cylinder 4 is lined up with the ice cream feed hole 502 (the relative position seen in FIG. 1). The ice cream G, pushed by the stirrer inside the freezing chamber 1 (the stirrer is started when the element 3 is rotated) passes through the holes 502 and 204 and fills the cavity of the cylinder 4 downstream of the piston 5, which is therefore pushed up in the direction of arrow F2. The upward movement of the piston 5 is limited for example by suitable stop means (not shown) engaging with the rod 6 of the piston itself, the precise position of which determines the "serving" of ice cream fed into the cylinder 4 in the course of the phase described above.

At this point, the cylindrical closing element 3 with its serving of ice cream is moved to the position shown in FIG. 2 by rotating it in the direction of arrow F3 until the port 204 is lined up with the port 602. At the same time the feed port 502 is closed by the wall of the closing element 3. At this point the piston 5 is pushed down inside the cylinder 4 in the direction of arrow F4 so that the serving of ice cream contained in the cylinder 4 is expelled through the dispensing hole 602. At the end of this stage the element 105 passes into the hole 602, expelling any residues of ice cream from it. At the end of this stage the device is returned to the position shown in FIG. 2, ready to dispense another serving of ice cream. Because of the presence of the channel 8 supplied with the refrigerating fluid of the evaporator 9, the region of the dispensing nozzle 602 is maintained at an optimal temperature, eliminating or greatly reducing the dripping that usually occurs in this area.

Figure 3:
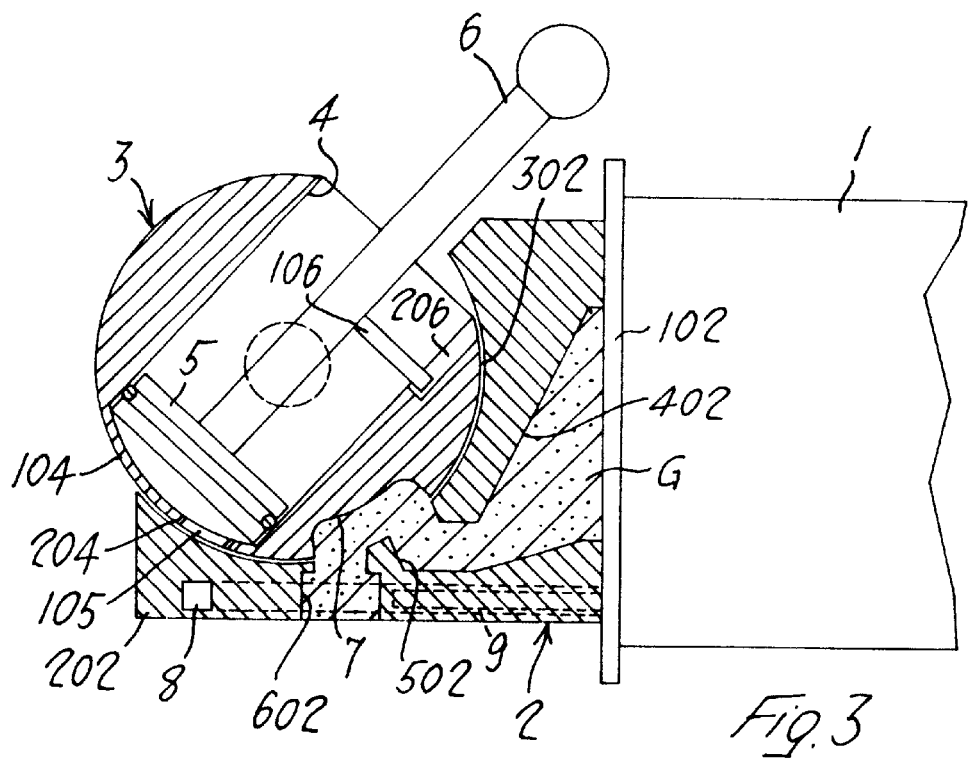
FIG. 3 is a view similar to FIGS. 1 and 2, in which the cylindrical closing element of the device according to the invention has been rotated until a passage formed in its side wall is simultaneously superimposed over the ice cream feed hole and the ice cream dispensing hole, connecting them together directly.

FIG. 3 illustrates a particular condition of the door according to the invention. At the end of a working day, or whenever it is desired to wash both the freezing chamber and all the parts of the dispensing piston assembly through which the ice cream passes, the following process is carried out.

With the cylindrical closing element 3 in the rest position shown in FIG. 2, it is rotated to the position shown in FIG. 3, in the clockwise direction (arrow F3), until the channel 7 running through the cylindrical side wall of the closing element 3 reaches the position in which it connects together the hole 502 and the hole 602 (position shown in FIG. 3).

When the stirrer inside the freezing chamber 1 is now started, all residual ice cream present in the freezing chamber 1 is emptied out, to be collected in a suitable container (not shown). At this point, the piston having returned to the position shown in FIG. 2, a washing mixture is introduced into the freezing chamber 1, then also passed into the cylinder 4 by positioning the closing element 3 in the position shown in FIG. 1, after which the closing element 3 is moved into the position shown in FIG. 2, causing the washing solution to be drained from the cylinder 4. The cylindrical closing element 3 is then moved into the position shown in FIG. 3 so that all of the washing mixture is drained out. If necessary, these steps are repeated as required, thus washing and completely sanitizing all parts in the flow line of the ice cream.

Naturally, the operation of the piston 5 rod, and consequently the rotation of the closing element 3 and the raising and lowering of the piston 5, may be effected by any mechanical device capable of causing the rod 6 of the piston to move translationally and rotationally along or about two orthogonal axes. It may of course also be effected manually, although the present device was mainly designed for use in automatic machines.

The present invention is therefore not limited to the embodiment illustrated and described but encompasses all those modifications and variants that come within the more general scope of the invention, essentially as claimed below.

I claim:

1. Piston device for dispensing controlled amounts of pasty substances, such as ice creams, that is connectable to the freezing chamber of an ice cream making machine, comprising a cylindrical closing element mounted rotatably about its axis in a mating cradle support, recessed into which cylindrical closing element is a cylinder that extends diametrically across the said closing element and is closed at the bottom by a wall containing a hole, while a piston slides axially inside the said cylinder, and in which the said cradle support contains a communicating hole leading to the freezing chamber of the ice cream making machine, so that in one angular position of the said cylindrical closing element the said hole of the support is lined up with the hole of the bottom wall of the said cylinder, while in a second angular position of the said cylindrical closing element the said hole of the bottom wall of the cylinder is lined up with a dispensing hole provided in the said cradle support, while the side wall of the said cylindrical closing element is provided with an elongate passage which in a third position of the said cylindrical closing element connects together the feed hole and the dispensing hole of the support, bypassing the said cylinder.

2. Device according to claim 1, in which the said dispensing piston device is part of a door closing the freezing chamber of an ice cream making machine, the said door comprising a base that is attached leaktightly by suitable fixing means to the end of the chamber, and a part in which said cylindrically profiled cradle housing is formed.

3. Device according to claim 2, characterized in that he base of the said door contains a channel that communicates on one side with the chamber, while on the other side it ends in a first hole that opens into the housing.

4. Device according to claim 3, in which a second hole is provided at a short distance downstream of the said first hole and communicates on one side with the said housing, while on the other side it communicates with the exterior, forming the ice cream dispensing hole.

5. Device according to claim 4, in which the said cylindrical closing element is mounted rotatably inside the said housing.

6. Device according to claim 5, in which the said cylindrical closing element contains a cylinder whose axis, which is perpendicular to the axis of the said closing element, extends diametrically across the said cylindrical closing element, the said cylinder being open at its end furthest from the housing, while at its other end it is closed by a wall containing a hole.

7. Device according to claim 6, in which the said hole of the said cylindrical closing element is eccentric with respect to the axis of the said cylinder.

8. Device according to claim 7, in which a sliding piston is mounted inside the said cylinder.

9. Device according to claim 8, in which the said piston is provided with a crown with a radius of curvature that fits the radius of curvature of the bottom wall of the said cylinder.

10. Device according to claim 9, in which the said piston crown is provided with a circular button, that projects outwards and is complementary to the hole in which it can engage.

11. Device according to claim 10, in which the said piston is provided with a control rod, projecting radially outwards from which is a pin capable of being engaged in a slot formed in the inside wall of the said cylinder along one of the generatrices of the said cylinder.

12. Device according to claim 11, in which there is formed on the cylindrical side wall of the closing element an elongate passage capable of directly connecting together said first and second holes and which respectively feed and dispense the ice cream.

13. Device according to claim 12, in which there is formed in the bottom of the said door, all the way around the ice cream dispensing hole, an essentially U-shaped channel that surrounds the said hole, the said channel being connected to the evaporator circuit of the refrigerating system of the freezing chamber.

* * * * *